(12) United States Patent
Hughes

(10) Patent No.: US 8,780,150 B2
(45) Date of Patent: Jul. 15, 2014

(54) METHOD OF MAKING A LABORATORY SLIDE

(76) Inventor: Thomas Fergus Hughes, Netherfield (GB)

( * ) Notice: Subject to any disclaimer, the term of this patent is extended or adjusted under 35 U.S.C. 154(b) by 260 days.

(21) Appl. No.: 13/063,868

(22) PCT Filed: Sep. 15, 2009

(86) PCT No.: PCT/GB2009/051196
§ 371 (c)(1),
(2), (4) Date: Apr. 20, 2011

(87) PCT Pub. No.: WO2010/032045
PCT Pub. Date: Mar. 25, 2010

(65) Prior Publication Data
US 2011/0187806 A1     Aug. 4, 2011

(30) Foreign Application Priority Data

Sep. 19, 2008  (GB) .................................. 0817125.8

(51) Int. Cl.
*B41J 2/32*   (2006.01)
(52) U.S. Cl.
USPC .......................................................... 347/171
(58) Field of Classification Search
USPC .................. 347/171–173, 176, 221
See application file for complete search history.

(56) References Cited

U.S. PATENT DOCUMENTS

| | | | |
|---|---|---|---|
| 4,679,914 A | 7/1987 | Rosenberg | |
| 5,963,368 A | 10/1999 | Domanik et al. | |
| 7,009,630 B1 | 3/2006 | Finger et al. | |
| 7,094,732 B2 | 8/2006 | Finger | |
| 7,163,728 B2 | 1/2007 | Finger | |
| 8,013,884 B2 * | 9/2011 | Schlinkmann et al. | 347/171 |
| 2001/0039896 A1 | 11/2001 | Edwards | |
| 2009/0223390 A1 | 9/2009 | Schlinkmann et al. | |

FOREIGN PATENT DOCUMENTS

| | | |
|---|---|---|
| DE | 102 35 611 A1 | 2/2004 |
| GB | 2235163 A | 2/1991 |
| JP | 09080318 A | 3/1997 |
| WO | WO 2007/115374 A1 | 10/2007 |
| WO | WO 2008/024496 A2 | 2/2008 |

OTHER PUBLICATIONS

PCT/GB2009/051196 International Search Report.
GB 0817125.8: Search Report under Section 17.

* cited by examiner

*Primary Examiner* — Kristal Feggins
(74) *Attorney, Agent, or Firm* — Fay Sharpe LLP

(57) ABSTRACT

A method of marking a laboratory slide (3) includes providing a tape (9) having dye (10) between a thermal print head (4) and a marking surface (2) of a laboratory slide (3). The dye (10) is on the side of the tape (9) facing the marking surface (2) and the tape (9) is pinched between the thermal print head (4) and the marking surface (2). The thermal print head (4) is heated and applied to the tape (9) so that dye (10) from the tape (9) is vaporised by the thermal print head (4) and the vaporised dye ingresses into the marking surface (2) to mark the marking surface. In a modification, an inkjet printer prints a dye mark on the tape and a heated pad is pressed against the tape to apply the dye mark to the marking surface.

20 Claims, 2 Drawing Sheets

METHOD OF MAKING A LABORATORY SLIDE

The present invention relates to a method of marking a laboratory slide having a marking or writing surface.

One method of marking laboratory slides involves using an ink jet printer to create the required marking or text. The ink is fired onto the marking or writing surface and is then cured using ultraviolet light.

Another method involves using hot foil printing technology to print the required marking or text onto the marking surface.

Yet another method requires the laboratory slide to have a coloured marking or writing surface and a printer is used to etch away the marking surface to create the required marking or text.

A problem with the inkjet and hot foil printing methods is that the marked marking surface is susceptible to damage by scratching and chemicals and solvents applied to the laboratory slide during its processing. A problem with the printer etching method is that it produces much less clear contrasting marking on the slide marking surface than either the inkjet or hot foil printing methods and is thus more difficult to read. Also, the printer etching method is slow if a rotating tool is used and costly if a laser is used.

It is an object of the present invention to provide a method to alleviate at least one of the above-mentioned problems.

According to the present invention there is provided a method of marking a laboratory slide, comprising:

(a) providing a tape between heating means and a marking surface of a laboratory slide, and providing dye on said tape;

(b) heating the heating means; and (c) applying the heated heating means to the tape so that dye from the tape ingresses into the marking surface to mark the marking surface of the slide.

By the dye ingressing or penetrating into the marking surface of the slide, the marked marking surface becomes very resistant to surface abrasion and is protected from the chemicals and solvents that may be applied to the laboratory slide during its processing. It is the marking surface material itself that protects the dye which has ingressed into it. The method produces extremely high print quality and enables full colour printing. The ability to print in colour enables enhanced colour coding and barcode production and enables symbol identification of a marked slide to be possible. Marking is quicker than printer etching using a rotating tool and the apparatus required is cheaper than that required for printer etching using a laser. The marking surface may comprise resin.

Step (a) may include the dye being on the side of the tape facing the marking surface.

Step (c) may include dye being vaporised by the heating means to mark the marking surface.

The method may include step (d) comprising applying a protective transparent coating over the marked marking surface. This seals the surface and protects the ingressed dye closest to the surface from the chemicals and solvents that may be applied to the laboratory slide during its processing. Step (d) may include (i) providing a tape portion having said protective transparent coating between the heating means and the marking surface of the slide, and (ii) applying the heated heating means to the tape portion having said protective transparent coating so that said protective transparent coating is applied to the marked marking surface.

The dye may be provided on a tape portion other than the tape portion having said protective transparent coating. The tape may have a plurality of alternate tape portions having said protective transparent coating and said dye, respectively.

The tape may be moved between the heating means and the marking surface of the slide so that the tape portion having said dye is between the heating means and the marking surface when the marking surface is to be marked, and the tape portion having said protective transparent coating is between the heating means and the marking surface when the marking surface is to have the protective transparent coating applied to it.

Providing dye on the tape may comprise applying a mark in said dye to the tape, and wherein step (c) causes the marking surface to be marked by dye from the dye mark ingressing into the marking surface. Alternatively, the tape is provided with a protective transparent coating and a mark is applied in said dye on to the protective coating, and wherein step (c) causes the marking surface to be marked by dye from the dye mark ingressing into the marking surface and to have applied over the marked marking surface at least part of the protective transparent coating. The mark may be applied by ink jet printing.

A thermal print head may be provided for the heating means.

Step (b) may comprise heating at least one wire of a plurality of wires of the thermal print head to mark the marking surface.

Step (c) may include applying the at least one heated wire to the tape so as to mark the marking surface of the slide.

The above-mentioned step d(ii) may comprise heating and applying sufficient wires of the thermal print head to the tape portion having said protective transparent coating so that the marked area of the marking surface is coated.

The method may include the step of pinching the tape between the heating means and the marking surface of the slide.

Embodiments of the present invention will now be described, by way of example, with reference to the accompanying schematic drawings, in which.

Figure 1:
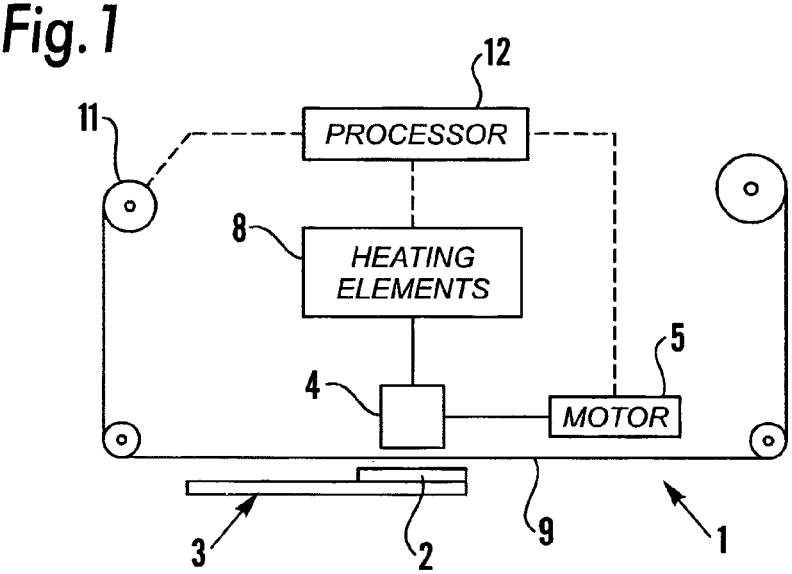
FIG. 1 is a view of a laboratory slide marking device for implementing the marking method according to one embodiment of the invention.
Figure 2:
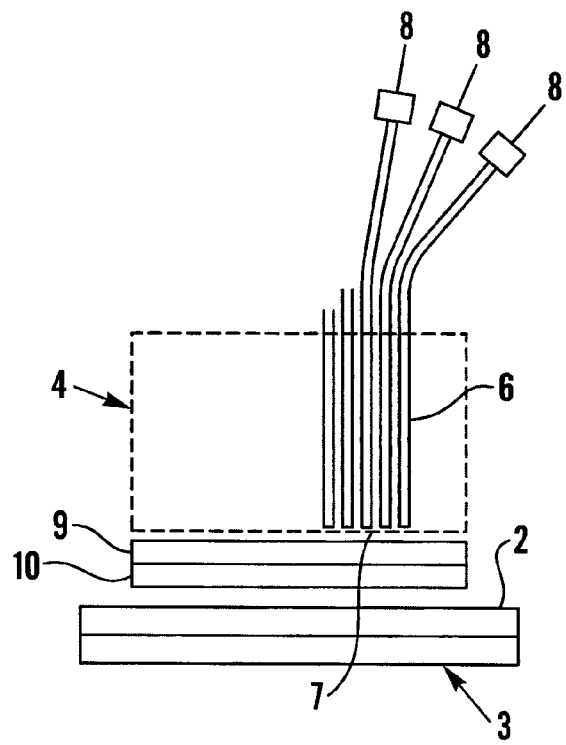
FIG. 2 is a sectional view of a thermal print head and tape of the device.

Referring to FIGS. 1 and 2 of the accompanying drawings, a device 1 is arranged to mark the marking or writing surface 2 of a laboratory slide 3.

The device 1 has a thermal print head 4 which is arranged to be moved by a motor 5. The thermal print head 4 comprises a plurality of wires 6 arranged in a row and the tips or ends 7 of the wires 6 face the marking surface 2. Each wire 6 is connected to a heating element 8.

A micro-thin tape 9 is placed between the wire ends 7 and the marking surface 2 and the side of the tape 9 facing the marking surface 2 has a dye coating 10 applied to it. The tape 9 can be moved by rollers 11.

An electronic control processor 12 is connected to the thermal print head motor 5, the heating elements 8, and the tape rollers 11.

Figure 3:
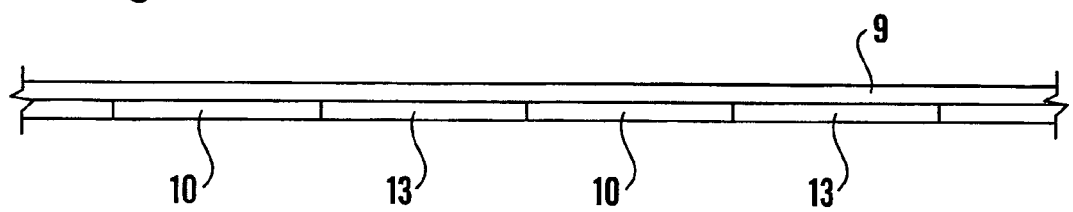
FIG. 3 is a longitudinal view of the tape.

Referring to FIG. 3, the tape 9 comprises a sequence of tape portions with alternate tape portions having the dye coating 10 and a protective clear or transparent coating 13, respectively.

In use, a laboratory slide 3 is positioned so that its marking surface 2 is facing the thermal print head 4 and the tape 9 is pinched between the marking surface 2 and the thermal print head 4.

An operator of the device 1 selects a particular mark to be marked on the marking surface 2 of the laboratory slide 3. To form the mark, selected ones of the wires 6 are heated by their respective heating elements 8 controlled by the control processor 12. This causes dye 10 on the other side of the tape 9 to the thermal print head 4 to be vaporised by the heated wire ends 7 and the vaporised dye ingresses or penetrates into the marking surface 2 to mark the marking surface 2 of the laboratory slide 3. The thermal print head 4 is then moved incrementally along the marking surface 2 under the control of the electronic control processor 12 and successive selections of wires 6 are heated until the required mark, such as text or a barcode, on the marking surface 2 of the laboratory slide 3 is completed.

Figure 4:
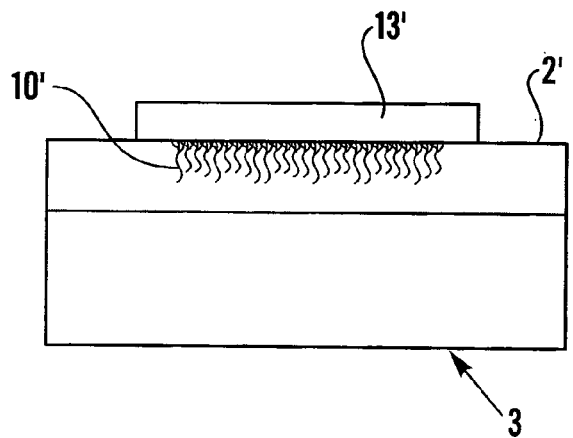
FIG. 4 is a sectional view of a marked laboratory slide.

When marking of the slide 3 has finished, the tape 9 is moved by the rollers 11 until a tape portion having the protective transparent coating 13 is between the thermal print head 4 and the marked surface 2. With reference to FIGS. 2 and 4, all the wires 6 are heated and the thermal print head 4 is moved over the marked surface 2' so that the heated wire ends 7 cause protective transparent coating to be transferred from the tape portion 13 to the marked surface 2' thus forming a protective layer 13' over the marked surface 2' and sealing in the dye 10' ingressed in the marked surface 2' forming the required mark.

The slide 3 is then removed and a new slide is positioned so that its marking surface is facing the thermal print head 4. The tape 9 is moved by the rollers 11 until a tape portion having dye 10 is between the thermal print head 9 and the marking surface 2.

In a specific example of a preferred embodiment, the marking surface 2 of the laboratory slide 3 comprises resin and the protective transparent coating 13 also comprises resin.

Figure 5:
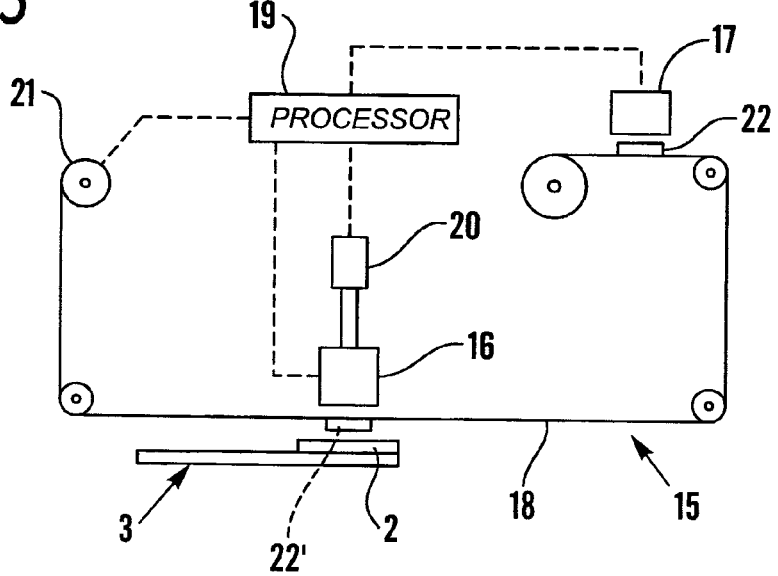
FIG. 5 is a view of a modified laboratory slide marking device for implementing the marking method according to another embodiment of the invention.

FIG. 5 illustrates a modified laboratory slide marking device 15 in which the thermal print head is replaced by a heat pad 16 and an inkjet print head 17 and the heat pad 16 is placed opposite the marking surface 2 of the slide 3. A portion of a blank tape 18 is between the heat pad 16 and the marking surface 2 and another portion of the tape 18 is opposite the inkjet print head 17 which is located away from the heat pad 16. The electronic control processor 19 is connected to the heat pad 16, an actuator 20 for the heat pad 16, the inkjet print head 17, and tape rollers 21 and controls them.

In use, the portion of the tape 18 opposite the inkjet print head 17 has a mark 22, such as an image/text or a barcode, formed by dye droplets printed on it by the inkjet print head 17 using a dye which the tape 18 is formulated to accept. The tape portion with the dye mark 22 is moved by the rollers 21 until the tape portion is between the heat pad 16 and the marking surface 2 with the dye mark 22' (shown dotted) on the tape 18 facing the marking surface 2. The pad 16 is heated and the pad actuator 20 is actuated to press the heated pad 16 against the marking surface 2. This applies the dye mark 22' on the tape 18 to the marking surface 2 by the dye droplets bursting and penetrating deep into the marking surface 2 and the applied mark is protected by the material of the marking surface 2 which is chemically resistant.

A protective transparent layer can be applied to the marked marking surface to increase durability. This may be done using a separate tape having a transparent coating which is applied to the marked marking surface.

In a modification, the tape has alternate tape portions or sections being uncoated and having a clear protective coating, respectively, in a similar manner to that shown in FIG. 3 so that the inkjet print head prints the mark on the uncoated tape portion enabling the mark to be applied and then be coated.

Figure 6:
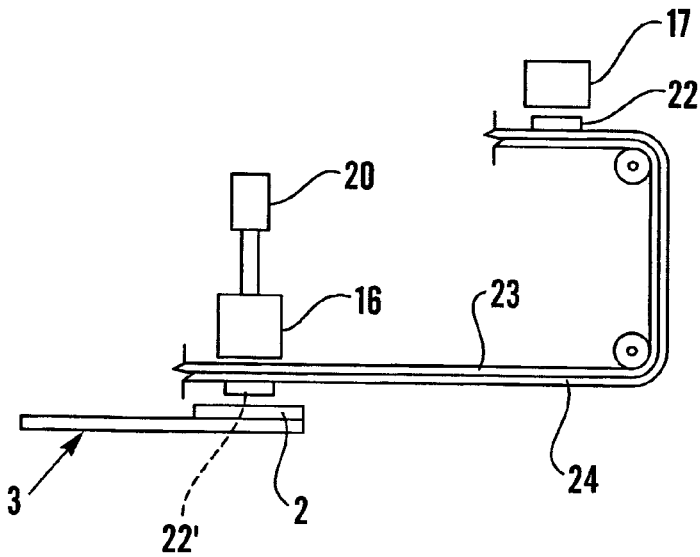
FIG. 6 is a modified view of part of the device of FIG. 5.

In another modification illustrated in FIG. 6, the whole surface of the tape 23 is coated with the clear protective coating 24 and the inkjet print head 17 prints the dye mark 22 onto the surface of the coating 24 with the dye being vaporised and ingressing into the marking surface 2 at the same time as the coating 24 is applied.

Whilst particular embodiments have been described, it will be understood that various modifications may be made without departing from the scope of the invention.

The invention claimed is:

1. A method of marking a laboratory slide, comprising:
   (a) providing a tape between a heater and a marking surface of a laboratory slide, and providing dye on said tape;
   (b) heating the heater; and
   (c) applying the heated heater to the tape so that dye from the tape ingresses into the marking surface to mark the marking surface of the slide.

2. The method as claimed in claim 1, wherein step (a) includes the dye being on the side of the tape facing the marking surface.

3. The method as claimed in claim 1, wherein step (c) includes vaporizing dye by the heater to mark the marking surface.

4. The method as claimed in claim 1, including step (d) comprising applying a protective transparent coating over the marked marking surface.

5. The method as claimed in claim 4, wherein step (d) includes (i) providing a tape portion having said protective transparent coating between the heater and the marking surface of the slide, and (ii) applying the heated heater to the tape portion having said protective transparent coating so that said protective transparent coating is applied to the marked marking surface.

6. The method as claimed in claim 5, wherein providing said dye on said tape includes providing said dye on a tape portion other than the tape portion having said protective transparent coating.

7. The method as claimed in claim 6, wherein providing the tape includes providing the tape which has a plurality of alternate tape portions having said protective transparent coating and said dye, respectively.

8. The method as claimed in claim 7, wherein step d(ii) comprises heating and applying sufficient wires (6) of the thermal print head (4) to the tape portion having said protective transparent coating (13) so that the marked area (2') of the marking surface (2) is coated.

9. The method as claimed in claim 5, wherein step d(ii) comprises heating and applying sufficient wires (6) of the thermal print head (4) to the tape portion having said protective transparent coating (13) so that the marked area (2') of the marking surface (2) is coated.

10. The method as claimed in claim 6, including moving the tape between the heater and the marking surface of the slide so that the tape portion having said dye is between the heater and the marking surface when the marking surface is to be marked, and the tape portion having said protective transparent coating is between the heater and the marking surface when the marking surface is to have the protective transparent coating applied to it.

11. The method as claimed in claim 10, wherein step d(ii) comprises heating and applying sufficient wires (6) of the thermal print head (4) to the tape portion having said protective transparent coating (13) so that the marked area (2') of the marking surface (2) is coated.

12. The method as claimed in claim 6, wherein step d(ii) comprises heating and applying sufficient wires (6) of the thermal print head (4) to the tape portion having said protective transparent coating (13) so that the marked area (2') of the marking surface (2) is coated.

13. The method as claimed in claim 1, wherein providing said dye on said tape comprises applying a mark in said dye to said tape, and wherein step (c) causes said marking surface to be marked by dye from said dye mark ingressing into the marking surface.

14. The method as claimed in claim 13, wherein applying said mark in said dye involves ink jet printing.

15. The method as claimed in claim 1, wherein the method includes providing said tape with a protective transparent coating, wherein providing said dye on said tape comprises applying a mark in said dye to said protective coating on said tape, and wherein step (c) causes said marking surface to be marked by dye from said dye mark ingressing into the marking surface and to have applied over the marked marking surface at least part of said protective transparent coating.

16. The method as claimed in claim 1, including providing a thermal print head for the heater.

17. The method as claimed in claim 16, wherein step (b) comprises heating at least one wire (6) of a plurality of wires of the thermal print head (4) to mark the marking surface (2).

18. The method as claimed in claim 17, wherein step d(ii) comprises heating and applying sufficient wires (6) of the thermal print head (4) to the tape portion having said protective transparent coating (13) so that the marked area (2') of the marking surface (2) is coated.

19. The method as claimed in claim 17, wherein step (c) includes applying said at least one heated wire (6) to the tape (9) so as to mark the marking surface (2) of the slide (3).

20. The method as claimed in claim 1, including the step of pinching the tape between the heater and the marking surface of the slide.

* * * * *